US005345859A

United States Patent [19]

Sugiura et al.

[11] Patent Number: 5,345,859

[45] Date of Patent: Sep. 13, 1994

[54] PUSHER CYLINDER FOR TUNNEL KILN

[75] Inventors: Toshifumi Sugiura; Kazuhiro Miyahara, both of Nagoya, Japan

[73] Assignee: NGK Insulators, Ltd., Japan

[21] Appl. No.: 611,463

[22] Filed: Nov. 13, 1990

Related U.S. Application Data

[63] Continuation of Ser. No. 331,185, Mar. 31, 1989, abandoned.

[30] Foreign Application Priority Data

Mar. 31, 1988 [JP] Japan ............................ 63-42124[U]

[51] Int. Cl.$^5$ .............................................. F16J 1/00

[52] U.S. Cl. ...................................... 92/172; 92/187; 432/243

[58] Field of Search ............... 417/403, 404, 572, 900; 24/579 R; 432/141, 241, 243; 92/187, 172, 129

[56] References Cited

U.S. PATENT DOCUMENTS

| | | | |
|---|---|---|---|
| 97,231 | 11/1869 | Root | 92/187 |
| 549,962 | 11/1895 | Hemphill | 432/241 |
| 589,597 | 9/1897 | Freeman | 432/241 |
| 1,491,797 | 4/1924 | Harrison | 92/187 X |
| 2,818,314 | 12/1957 | Nicholas | 92/187 X |
| 3,173,344 | 3/1965 | Mongitore | 92/187 |
| 3,589,756 | 6/1971 | Pruvot | 92/187 X |
| 3,601,419 | 8/1971 | Fern | 277/205 |
| 3,633,885 | 1/1972 | Beck | 432/243 |
| 3,713,631 | 1/1973 | Enk et al. | 432/243 |
| 4,256,454 | 3/1981 | Wiersma | 432/241 |
| 4,401,038 | 8/1983 | Segrest | 432/243 X |

FOREIGN PATENT DOCUMENTS

| | | | |
|---|---|---|---|
| 540757 | 12/1931 | Fed. Rep. of Germany | 432/241 |
| 51-3143 | 1/1976 | Japan . | |

OTHER PUBLICATIONS

*Bimba Manufacturing* sales brochure Dec. 1986 1 sheet.

*Primary Examiner*—Thomas E. Denion
*Attorney, Agent, or Firm*—Parkhurst, Wendel & Rossi

[57] ABSTRACT

A pusher cylinder for a tunnel kiln is used for moving kiln cars loaded with products such as molded ceramic green products to be sintered in the tunnel kiln. A piston rod of the pusher cylinder is made to have a length more than twice a stroke of the pusher cylinder. With such an arrangement, even if foreign substances such as tar are attached to the piston rod extended into the tunnel kiln, the substances do not enter the pusher cylinder in the fully retracted position of the piston rod. As a result, there is no longer any risk of the pusher cylinder itself and a packing for a piston of the cylinder being damaged by such foreign substances. Therefore, the life span of the pusher cylinder and packing until they need to be replaced is remarkably prolonged.

3 Claims, 2 Drawing Sheets

PUSHER CYLINDER FOR TUNNEL KILN

This is a continuation of application Ser. No. 07/331,185 filed Mar. 31, 1989, now abandoned.

BACKGROUND OF THE INVENTION

This invention relates to a pusher cylinder for a tunnel kiln for moving kiln cars in the tunnel kiln.

Pusher cylinders have been used for many years for moving kiln cars loaded with molded ceramic green products in tunnel kilns used for sintering them. As shown by way of example in FIG. 1, a protrusion 13 is provided at a lower portion of a kiln car 12 loaded with molded ceramic green products to be sintered in a tunnel kiln 11. On the other hand, a projection 16 is provided at an outer end of a piston rod 15 of a pusher cylinder 14 and adapted to engage the protrusion 13 provided on the kiln car 12 so that the kiln car 12 is moved in the tunnel kiln 11 by driving of the pusher cylinder 14 through a distance corresponding to a stroke of the pusher cylinder 14.

With such a pusher cylinder constructed as above described, since the pusher cylinder 14 is provided near to the tunnel 11 with the aid of a rod support 17, a length of the piston rod 15 is only for example 60 cm longer than that of a stroke of the pusher cylinder 14. Therefore, part of the rod 15 to be received in the pusher cylinder 14 is also received in the tunnel kiln at different times.

Moreover, a ceramic green body generally includes an organic molding aid. Therefore, when the ceramic green body is sintered, the molding aid is decomposition by heating to produce a decomposed product, which is initially in the form of a gas or mist in a high temperature zone of the kiln, but solidifies in a low temperature zone into a tar or mist-like decomposition product which will be referred to hereinafter as "tar".

As a result, tar 18 (shown in dots on the piston rod 15 in FIG. 1) produced during sintering is attached to the piston rod 15 in the tunnel kiln 11 so that the tar 18 is carried along by the piston rod 15 into the pusher cylinder 14. The tar 18 remains in the pusher cylinder 14 and causes the pusher cylinder 14 and a packing 19 for a piston within the cylinder to be seriously damaged.

SUMMARY OF THE INVENTION

It is a primary object of the invention to provide an improved pusher cylinder for a tunnel kiln, which eliminates the disadvantage of the prior art and is free from foreign substances such as tar remaining in the pusher cylinder.

In order to achieve the above object, in a pusher cylinder for a tunnel kiln for moving kiln cars in the kiln, according to the invention a piston rod of the pusher cylinder has a length more than twice a stroke of the pusher cylinder.

With the construction of the pusher cylinder according to the invention, since the piston rod of the pusher cylinder is longer than twice the stroke of the pusher cylinder so that foreign substances such as the tar do not enter the pusher cylinder even in a fully retracted position of the piston rod. As a result, there is no longer any risk of the pusher cylinder itself and a packing for the piston being damaged by such foreign substances. Accordingly, the life span of the pusher cylinder and packing until they need to be replaced in remarkably prolonged.

The invention will be more fully understood by referring to the following detailed specification and claims taken is connection with the appended drawings.

DETAILED EXPLANATION OF PREFERRED EMBODIMENT

Figure 1:
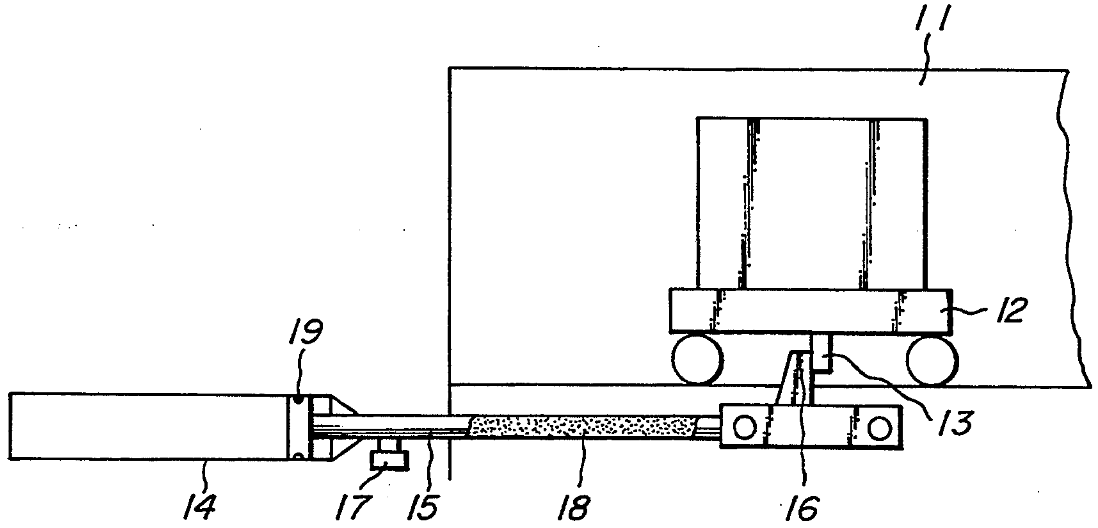
FIG 1 PRIOR ART
FIG. 1 is a drawing illustrating one example of a construction of a pusher cylinder for a tunnel kiln of the prior art.
Figure 2:
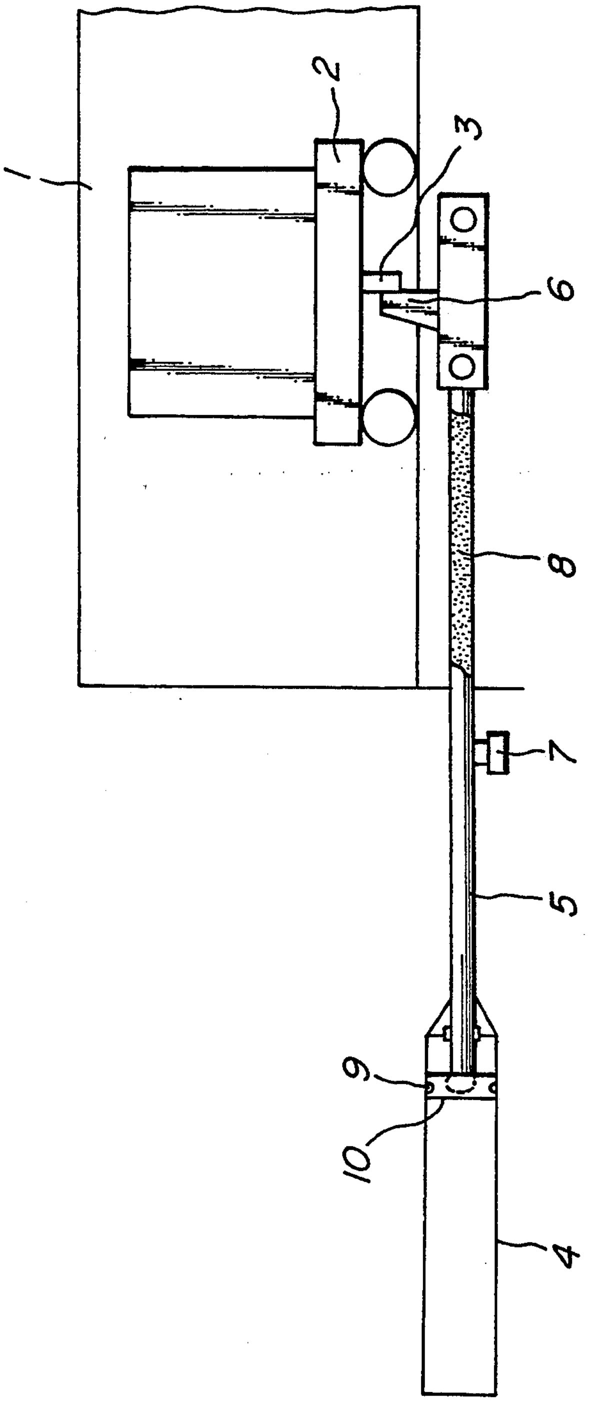
FIG. 2 is a drawing illustrating one embodiment of the pusher cylinder for a tunnel kiln according to the invention.

FIG. 2 illustrates one embodiment of the pusher cylinder according to the invention. In this embodiment, like the conventional pusher cylinder for the tunnel kiln, a protrusion 3 is provided at a lower portion of a kiln car 2 loaded with formed ceramic bodies to be sintered in the tunnel kiln 1. On the other hand, a projection 6 is provided at one end of a piston rod 5 of the pusher cylinder 4 and adapted to engage the protrusion 3 of the lower portion of the kiln car 2. The kiln car 2 is moved into the tunnel kiln 1 by an extension of the piston rod 5 through a distance corresponding to a stroke of the pusher cylinder 4. As can be seen from FIG. 2, a subject feature of the invention is to arrange the pusher cylinder 4 spaced away from the tunnel kiln or at a location remote from the tunnel kiln. In other words, the pusher cylinder 4 is arranged at a location where the length of the piston rod 5 of the pusher cylinder 4 is more than twice the stroke of the pusher cylinder 4 with the aid of a rod support 7.

With the pusher cylinder constructed as above described according to the invention, tar 8 which has attached to the piston rod 5 in its fully extended position as shown in FIG. 2 does not enter the pusher cylinder 4 even when the piston rod 5 has returned fully into the pusher cylinder 4.

In the pusher cylinder 4 according to the invention, since the piston rod 5 is longer than that of the prior art, it is preferable to form an end of the piston rod on the side of the piston 10 in a spherical shape and attach the spherical end to the piston 10 to take up any wobble of the long piston rod 5.

The invention is not limited to the embodiment above described and various changes and modifications may be made in the invention. For example, the piston rod may of course be made in a few separate parts, although it is made as a unitary body in the above embodiment.

As can be seen from the above explanation, the piston rod having a length of twice the stroke of the pusher cylinder for the tunnel kiln can prevent the tar from entering the cylinder so that the pusher cylinder and the packing for the piston are not damaged by foreign substances such as tar, with the result that the effective life span of the cylinder and packing is considerably prolonged.

What is claimed is:

1. A tunnel kiln comprising:

at least one kiln car movably disposed in the tunnel kiln; and a pusher cylinder comprising a cylinder arranged outside the tunnel kiln and a piston rod having a first end portion movably disposed within said cylinder and a second end portion movably disposed within an interior of the tunnel kiln and engaged with at least one kiln car, said piston rod having a length which is more than twice a stroke of said pusher cylinder;

wherein the pusher cylinder is arranged spaced from the tunnel kiln such that only said second end portion of the piston rod is exposed to the interior of the tunnel kiln when the pusher cylinder is extended.

2. The tunnel kiln of claim 1, further comprising a piston slidably arranged in said pusher cylinder, wherein said first end of said piston rod has a spherical shape and is attached to said piston, thereby accommodating any wobble occurring in said piston rod.

3. The tunnel kiln of claim 1, wherein a substantial portion of said second end portion of said piston rod is exposed to the interior of the tunnel kiln when said pusher cylinder is extended.

* * * * *